United States Patent
Sandin

(10) Patent No.: US 6,877,651 B2
(45) Date of Patent: Apr. 12, 2005

(54) METHOD OF JOINING CERAMIC OR GRAPHITE TO METAL WITH AN ALLOY HAVING HIGH NICKEL OR COBALT CONTENT, ALLOYS FOR JOINING THE SAME, AND PRODUCTS FORMED THEREWITH

(76) Inventor: Thomas A. Sandin, 807 Bain Pl., Redwood City, CA (US) 94062

( * ) Notice: Subject to any disclaimer, the term of this patent is extended or adjusted under 35 U.S.C. 154(b) by 0 days.

(21) Appl. No.: 10/307,317

(22) Filed: Dec. 2, 2002

(65) Prior Publication Data

US 2005/0040210 A1 Feb. 24, 2005

(51) Int. Cl.⁷ ............................................. B23K 31/02
(52) U.S. Cl. ................ 228/122.1; 228/121; 228/124.1; 228/124.5
(58) Field of Search .............................. 228/122.1, 121, 228/124.1, 124.5, 119; 420/438, 451

(56) References Cited

U.S. PATENT DOCUMENTS

| | | | |
|---|---|---|---|
| 4,621,761 A | | 11/1986 | Hammond et al. |
| 4,763,828 A | | 8/1988 | Fukaya et al. |
| 4,830,934 A | * | 5/1989 | Ferrigno et al. ............ 428/678 |
| 4,883,218 A | | 11/1989 | Dunn et al. |
| 5,139,738 A | * | 8/1992 | Beltran et al. ............... 420/436 |
| 5,240,491 A | * | 8/1993 | Budinger et al. ............. 75/255 |
| 5,340,012 A | | 8/1994 | Beeferman et al. |
| 5,807,626 A | | 9/1998 | Naba |
| 6,365,285 B1 | * | 4/2002 | Chesnes ...................... 428/668 |
| 6,367,686 B1 | * | 4/2002 | Abriles et al. ............... 228/206 |
| 6,378,755 B1 | * | 4/2002 | Grylls et al. ............. 228/122.1 |
| 6,440,596 B1 | | 8/2002 | Ruhl et al. |
| 6,464,128 B1 | * | 10/2002 | Messelling et al. ......... 228/119 |
| 6,616,032 B1 | * | 9/2003 | Gasse et al. ............. 228/248.1 |
| 6,652,677 B2 | * | 11/2003 | Speigel et al. ............... 148/525 |

OTHER PUBLICATIONS

*Solid Oxide Fuel Cell Performance Studies*, Wayne Huebner, et al., Department of Ceramic Engineering, University of Missouri—Rolla.

*Key Advances and Supporting Methodology*, Review Report GR/M40271/01, http://www.brunel.ac.uk./faculty/tech/mechanical/Research.opt/Reports.opt/ping1.html.

* cited by examiner

Primary Examiner—L. Edmondson
(74) Attorney, Agent, or Firm—Rossi, Kimms & McDowell, LLP

(57) ABSTRACT

A brazed product has a metal substrate, a ceramic or graphite substrate, and a brazing alloy containing one of a high nickel content and cobalt content joining the ceramic or graphite substrate to the metal substrate. A method of joining these materials include providing a metal layer coating of titanium or nickel on the surface of the ceramic or graphite substrate to be joined or using a high nickel content or high cobalt content and containing titanium. The brazing alloy contains a high nickel content 70–95% by weight, or a high cobalt content between 45–55% by weight. This brazing alloy can contain titanium in the range between 0.5–5% by weight.

27 Claims, 3 Drawing Sheets

METHOD OF JOINING CERAMIC OR GRAPHITE TO METAL WITH AN ALLOY HAVING HIGH NICKEL OR COBALT CONTENT, ALLOYS FOR JOINING THE SAME, AND PRODUCTS FORMED THEREWITH

BACKGROUND

Ceramics offer attractive physical and mechanical properties to designers of, for example, advanced gas turbine engines, fuel cells, and electronic devices. In many cases, optimum utilization of these materials requires that they be joined to a metallic structure or body. Brazing is usually the preferred way of achieving the bonding, but the differences in ceramic and metallic properties can cause problems. Ceramic materials have lower coefficients of thermal expansion than most metals or alloys. Significant differences in the thermal expansion coefficients between these materials can generate thermal stresses across the joint during the brazing process or in subsequent use. Moreover, standard brazing alloys do not wet and flow well on ceramic surfaces.

Techniques have been developed to overcome the problems noted above. Relatively soft metals like copper or nickel can be used to better accommodate thermal stresses. If hermetic seals between the metal and ceramic joint are not required, fiber metal pads can be used. To create a brazeable surface, a metallic coating can be applied to the ceramic by a process commonly referred to as metallizing. Direct brazing, on the other hand, allows the brazing alloys to bond directly to metals or alloys. This has been made possible by the development of activated brazing alloys, which can wet and bond to ceramic surfaces. Most activated alloys contain titanium as the active metal component, but other metals such as zirconium, yttrium, or niobium can be used. Typically, the active alloys are gold, silver, or copper based. The problem with these brazing alloys is that gold migrates into the metal bonded with the ceramic when it is exposed to high temperatures for long periods, whereas silver and copper break down when they are exposed to an oxidizing atmosphere, damaging the brazed joint.

Currently available ceramic-to-metal brazing techniques are usable for relative low temperature applications, from room temperature to about 400–575° F. Advanced applications now being contemplated will subject the joint to much higher temperatures for extended duration, and in highly oxygen rich or oxidizing atmospheres. For example, internal temperatures of solid oxide fuel cells (SOFCs) can reach 1840° F., and thousands of hours of service will be required. Gas turbine operation will require even higher temperatures for similar extended times.

Presently, there are no economical or practical techniques available to produce the ceramic-metal joints for high temperature, long duration applications. The present invention addresses these needs.

SUMMARY

The present invention relates to a method of joining or bonding ceramic or graphite to metal with an alloy having a high nickel or cobalt content, and alloys and products thereof.

One aspect of the present invention is a method of joining ceramic and metal substrates, which includes placing an alloy between surfaces of the ceramic and metal substrates to be joined to form an assembly of ceramic-alloy-metal layers, brazing the assembly to join the ceramic and metal substrates. The alloy contains at least one of a high nickel content by weight and a high cobalt content by weight. The alloy can be in a form of a tape, preform, coating, or any expedient configuration. The surface of the ceramic substrate to be joined can be coated with a metal layer, which can be composed of titanium or nickel. The alloy also can contain titanium in the range of 0.5–5 wt %.

The alloy can contain 70–95 wt % nickel. In this regard, the alloy can be any of AMS4776, AMS4777, AMS4778, AMS4779, AMS4782, and BNi-6. Alternatively, the alloy can contain 45–55 wt % cobalt, such as AMS 4783.

The ceramic substrate can be composed of at least one of alumina, silicon carbide, silicon nitride, single crystal sapphire, and zirconia.

Another aspect of the present invention is a product having a metal component and one of ceramic and graphite components, and the alloy described above. A coating of a metal layer, such as titanium or nickel, can be formed on the surface of the ceramic or graphite component. The ceramic component can be alumina, silicon carbide, silicon nitride, single crystal sapphire, and zirconia.

The product can be an engine component or fuel cell. The engine component can be an inlet guide vane. The ceramic component of the fuel cell can be yttria stabilized zirconia and the metal component thereof can contain at least 94.5 wt % chromium.

Another aspect of the present invention is the alloy as previously described for joining or brazing a metal component to one of ceramic and graphite components.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

The present joining method uses alloys or brazing alloys that contain a high weight percentage of nickel or cobalt, and is suitable for high temperature applications, even in an oxidizing environment, such as in fuel cells and turbine engines. Some examples of alloys usable according to the present invention are those designated specifically in Aerospace Material Specifications (AMS), such as AMS4776, AMS4777, AMS4778, AMS4779, AMS4782, and AMS4783, and by the American Welding Society as BNi-6. The nominal composition by weight percent of these brazing alloys are set forth in Table 1 and their brazing temperature ranges in Table 2.

TABLE 1

Composition of Brazing Alloys by Weight Percent

ELEMENTS

| ALLOYS | B | C | Si | P | Cr | Fe | W | Co | Ni |
|---|---|---|---|---|---|---|---|---|---|
| AMS4776 | 3.0 | 0.06 Max | 4.5 | | 14.0 | 4.5 | | | Balance |
| AMS4777 | 3.1 | 0.06 Max | 4.5 | | 7.0 | 3.0 | | | Balance |
| AMS4778 | 3.1 | 0.06 Max | 4.5 | | | | | | Balance |
| AMS4779 | 1.9 | 0.06 Max | 3.5 | | | | | | Balance |
| AMS4782 | | 0.06 Max | 10.2 | | 19.0 | | | | Balance |
| AMS4783 | 0.8 | 0.06 Max | 8.0 | | 19.0 | | 4.0 | Balance | 17.0 |
| BNi-6 | | 0.06 Max | | 11.0 | | | | | Balance |

TABLE 2

Brazing Temperature Range for Brazing Alloys

| ALLOY | BRAZING TEMPERATURE IN ° F. |
|---|---|
| AMS4776 | 2000–2150 |
| AMS4777 | 1850–2150 |
| AMS4778 | 1850–1975 |
| AMS4779 | 1950–2100 |
| AMS4782 | 2125–2175 |
| AMS4783 | 2100–2200 |
| BNi-6 | 1700–1850 |

Figure 1:
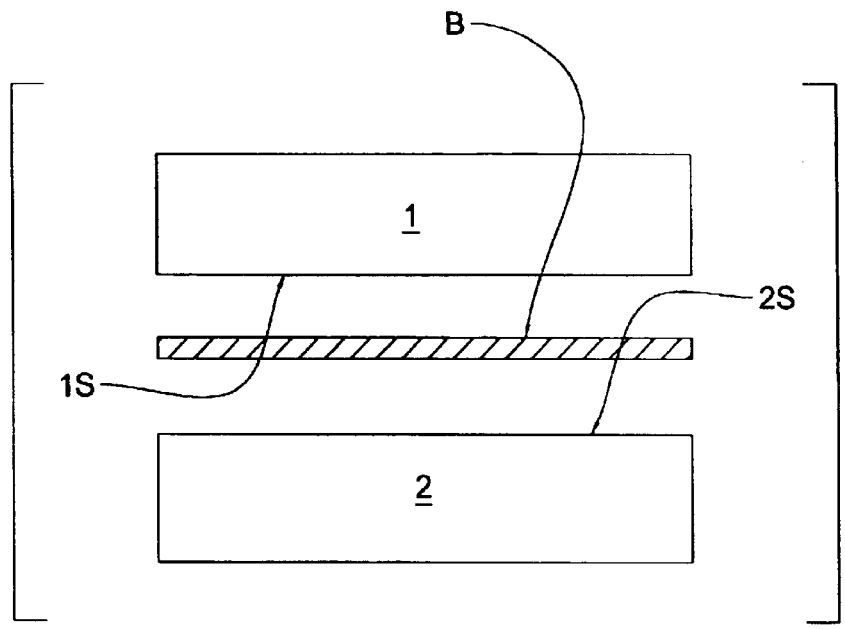
FIG. 1 schematically illustrates an exploded cross section of ceramic and metal substrates to be brazed.
Figure 2:
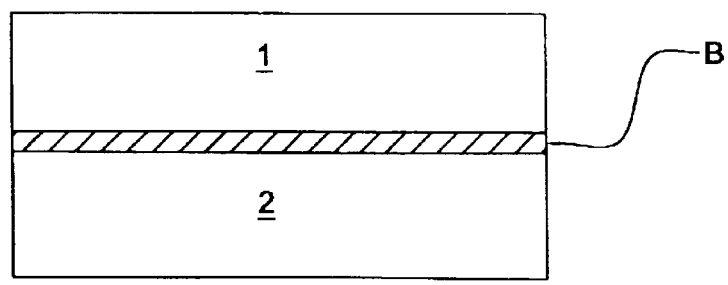
FIG. 2 schematically illustrates a cross-section of the brazed ceramic and metal substrates of FIG. 1.
Figure 4:
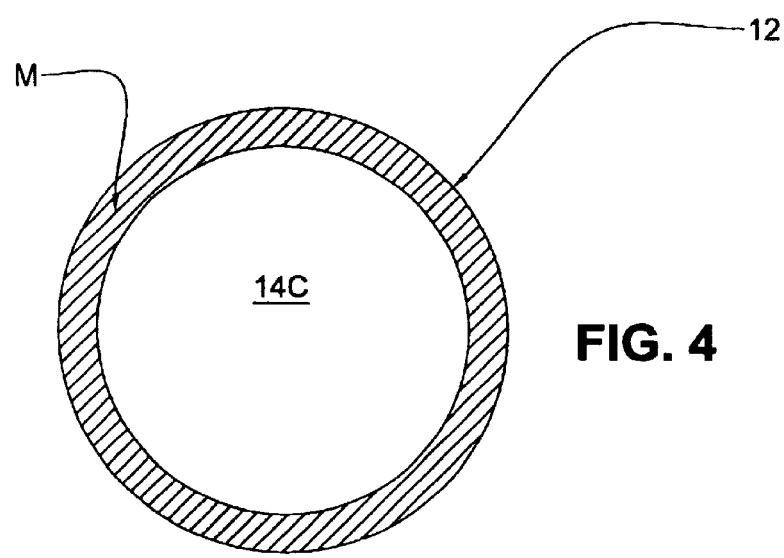
FIG. 4 schematically illustrates a top view of the ceramic substrate of FIG. 4 with a metallized outer peripheral area.

Referring to FIGS. 1–2 and 4, the present method of joining a ceramic substrate (one component) 1 to a metal substrate (another component) 2 includes surface preparation, assembly, and heating or brazing operations. The surface preparation operation can include a cleaning operation, which applies to both the ceramic and metallic bodies 1, 2. The cleaning operation is designed to remove extraneous material, such as oxide films on the metal, dirt, or oil films, that may be detrimental to or interfere with brazing or bonding of the surfaces 1S, 2S to be joined. A mechanical, chemical, or solvent cleaning process can be used. Grit blasting the surfaces 1S, 2S of the components 1, 2 with fine silicon carbide (SiC) is a typical mechanical cleaning process. For example, the surfaces 1S, 2S to be joined can be blasted with 240 grit silicon carbide grit media at 80 psi (for metal surface 1S) and at 20 psi (for ceramic surface 2S). Alternatively, an abrasive paper or cloth can be used to clean the surfaces 1S, 2S if the components 1, 2 cannot withstand the blasting pressure. Another cleaning option, which is a typical chemical cleaning process, includes a pickling solution appropriate for the components 1, 2. For example, a chemical cleaning agent can be a 20% solution nitric acid applied at 125° F. After cleaning, the surface to be joined can be rinsed with a degreasing solvent or deionized water. Further, the surface of the ceramic component can be etched with a 50% solution of hydrochloric acid to roughen its surface, and then rinsed with water. In the absence of tenacious oxide films, aqueous detergent solutions or organic solvents can provide adequate cleaning. Ultrasonic agitation also can be used to enhance solvent cleaning, particularly to remove grinding residues from ceramic surfaces.

The surface preparation operation can further include treating the ceramic substrate so that the brazing alloy flows better on the surface 2S of the ceramic substrate 2. Specifically, referring to FIG. 4, a thin film of metal can be coated or metallized on the cleaned surface 2S of the ceramic substrate 12. See FIG. 4, which show the coating M on the ceramic substrate 12. This can be done for example by sputtering essentially pure (99.7%) titanium or nickel onto the surface 2S of the ceramic substrate, such as with a well known physical vapor deposition (PVD) method. The thickness of the coating can be as thin as 1 micrometer ($\mu$m) to as thick as 50 $\mu$m. Typically, the coating thickness lies in the 3–5 $\mu$m range for practical and cost reasons. The surface preparation operation can also include nickel plating the metal substrate 1, particularly when the metal component contains more than 1% titanium or aluminum (or combination of both).

Alternatively, the need for coating or metallizing the ceramic component 2 can eliminated by activating the braze alloys listed above in Table 1 with a small amount of titanium. The amount of titanium added can range from 0.5% to 5% by weight. The brazing alloy with or without mixed titanium can be applied as described below.

The assembly operation includes placing a selected brazing alloy between the surfaces or interfaces of the metal and ceramic substrates to be joined. In this regard, it would be expedient to provide a brazing alloy in a form of a tape, foil, or coating. Currently, the brazing alloys listed in Table 1 are commercially available in a form of tape or foil. But brazing alloys with titanium are not commercially available. Such alloys, however, can be formed as a tape or coating that can be set or placed onto the areas of the components 1, 2 to be joined. For example, a brazing alloy tape can be formed by mixing the selected alloy in a powder form with an organic binder. The brazing alloy powder and binder also can be made as a coating that can be applied over at least one of the surfaces of the components 1, 2 to be joined. Such a coating thus can he applied to coincide with the configuration of the desired joint area to form a preformed brazing alloy. The brazing alloy can be selected from any of the metals listed in Table 1, depending on the specific application, or any other brazing alloys containing a high weight percent of nickel (70–95 wt %) or cobalt (45–55 wt %).

It is preferable to hold the ceramic-brazing alloy-metal components in alignment, such as by applying sufficient pressure to hold them in alignment during the brazing cycle. In this respect, a fixture or clamp (not illustrated) can be used for this purpose. The fixture can maintain proper alignment of the components to be joined and also can apply pressure across the joint during the brazing or heating cycle. The fixture can be formed of graphite or any other suitable material for holding a stack of metal and ceramic in alignment. Similarly, a clamp, such as bolt and nuts, can be formed of graphite (or any other suitable material). Specifically, pressure across the joint during the heating cycle can be applied in a number of different ways. For example, pressure can be developed by using thermal expansion of different materials, such as graphite and stainless steel. The graphite can be made of a clamp while the stainless steel element can exert the pressure as it expands during the heating cycle. Alternatively, the fixture can be designed to hold a weight (application of pressure by gravity) against the stack to be joined. Some more sophisticated designs can use inflatable gas bags to apply the pressure.

The heating or brazing operation includes both heating the ceramic-brazing alloy-metal assembly and controlling the atmosphere during the brazing cycle. Most of the metallic components, especially titanium coatings, require brazing in an oxygen-free environment. Note that the brazing industry classifies vacuum as an atmosphere. High purity inert gases, such as argon, can also be used instead of vacuum. When vacuum is used, the pressure of 1×10$^{-4}$ torr is preferred during the brazing cycle. Too much vacuum can peel the metal coating from the ceramic component and can reduce the outer layer of the ceramic (e.g., zirconia oxide), and thus can degrade the bond strength of the sputtering.

The heating cycle is designed to minimize thermal stresses and distortion in the ceramic-metal assembly while considering the melt and flow characteristics of the brazing alloy. The present heating or brazing cycle includes heating the assembly at a controlled rate to an equalizing temperature (which is just below the solidus temperature of the braze alloy), hold at that temperature to allow the various components of the assembly to reach a uniform temperature (equalize), heat the same at a controlled rate to the brazing temperature (which is above the liquidus temperature of the braze alloy), hold at the brazing temperature for a sufficient time to ensure that all parts of the assembly reach the brazing temperature, control cooling to a temperature low enough for exposure of the assembly to ambient atmosphere. It is desirable to increase the heating rate as rapid as thermal gradients within the assembly will allow from the equalizing temperature to the brazing temperature to minimize liquation of the brazing alloy. Liquation is the separation of brazing alloy mixture by heating to a temperature at which lower-melting components liquefy around the joint area, which creates a porous, unsound joint. The cooling rate from the brazing temperature is controlled to minimize thermal gradients within the assembly, which can stress and distort the joint, and even result in a joint failure.

Two specific examples of application of the present brazing method are described below. The present brazing method, however, can also be applied to join different materials, such as metals and alloys, both ferrous and nonferrous, glass, graphite, and various ceramic materials, such as alumina, silicon carbide, silicon nitride, single crystal sapphire, and zirconia.

Referring to FIGS. 3–6, specific examples of application of the present brazing method include forming a SOFC 10 and an Inlet Guide Vane (IGV) assembly 20 of a gas turbine engine. The SOFC 10 comprises a plurality of alternately arranged metal and ceramic substrates 12, 14. In the example shown, the substrates 12, 14 are circular, as this provides the greatest electrolyte surface area for a given joint length. The surfaces of the metal and ceramic substrates to be joined are ring shaped, i.e., a narrow circular strip around the periphery, coinciding with the coated area M of FIG. 4. These areas are cleaned using SiC blasting and etching as previously explained. Referring to FIG. 4, only the areas of the ceramic to be joined are coated (coating M) with essentially pure titanium (99.7%) by sputtering. The rest 14C of the discs are masked or covered using a well known masking technique. Thereafter, brazing alloy preforms or tapes B are sandwiched between the substrates 12, 14, with the preforms or tapes B aligned with the sputtered area of the ceramic substrates. After the components of the SOFC are properly aligned, the assembly is placed in a fixture (not illustrated) to maintain alignment and clamped or loaded with weight to apply pressure. The assembly is then run through a brazing heat cycle as disclosed below.

Figure 3:
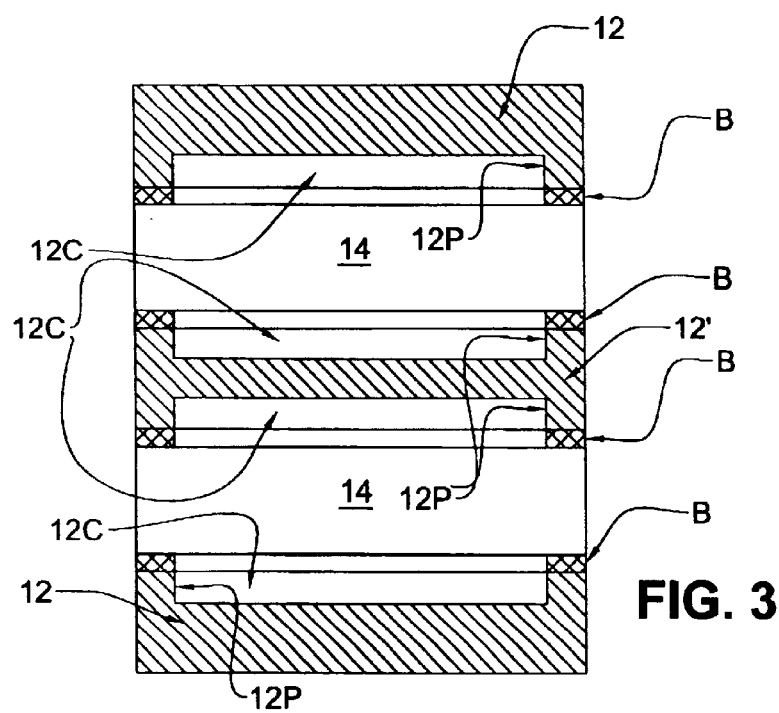
FIG. 3 schematically illustrates a cross section of an SOFC formed by stacks of ceramic and metal substrates.

In the example illustrated in FIGS. 3–4, the ceramic components 14 are made of yttria stabilized zirconia (YSZ), while the metal discs 12, 12' are high chromium materials commercially available from PLANSEE of Germany. Typical grades of such metal discs are CRF (94.5–95.5 wt % chromium) and DUCROPUR (99.7% chromium). Although the present example shows two YSZ discs 14 joined to three chromium alloy discs 12, 12', the present brazing method can be used to join many more or less layers of these discs or other similar discs.

In the present example, all of the discs have a 2" diameter. The perimeter of the CRF discs 12, 12', namely the area where it is joined to the YSZ discs 14, has a raised edge portion 12P, i.e., is made thicker, in a form of a ring or annular shape so that a chamber or cavity 12C forms within the interfaces of the CRF discs 12, 12' and the YSZ discs 14. The inner disc 12' has raised edge portions on both sides, as illustrated in FIG. 3. The particular configuration or pattern of the chamber 12C or the particular construction of the SOFC does not form part of the present invention. Rather, it is directed to the method of brazing metal-ceramic components of the SOFC and the products formed by such a method.

The YSZ discs 14 were cleaned, etched in 50% hydrochloric acid solution, rinsed, and dried. Both surfaces of the YSZ discs were coated along the outer periphery coinciding with the raised edge portion 12P of the metal component with 99.7% pure titanium 3–5 $\mu$m thick by sputtering (using the PVD method). The brazing alloy selected was AMS4782 in the form of 0.003 inch thick braze tape, which was cut to a ring shape conforming to the metallized areas M of the ceramic disc. The CRF and YSZ components were stacked into an array consisting of a CRF disc 12/brazing alloy tape B/YSZ disc 14/brazing alloy tape B/CRF disc 12'/brazing alloy tape B/YSZ disc 14/brazing alloy tape B/CRF disc 12. The assembly was clamped in a fixture, which is made of graphite retaining plates placed on the top and bottom of the assembly and held together with graphite bolts torqued to 10 psi to add compression to the braze assembly, and loaded into a vacuum brazing furnace. After the furnace was evacuated to 1×10$^{-4}$ torr, it was heated at a rate of 12° F. per minute to 1900° F. (just below the solidus temperature of AMS4782) and held there for 15 minutes to equalize temperature within the assembly and fixture. The temperature was raised at 12° F. per minute to the brazing temperature of 2120–2130° F. and held there for 5 to 7 minutes. Cooling was controlled at a cooling rate of 7–10° F. per minute to 1000° F., and then at a cooling rate of 15° F. per minute to 150° F.

The resulting assembly at room temperature was placed in a vice. The metal to ceramic components were chiseled apart to see how good the bond integrity was. Chiseling the joint and examining the broken pieces under a microscope can determine whether the integrity of the joint and seal would be good in lieu of thermally cycling the assembly. If the integrity is good, then the joint should shear at the ceramic portion, not at the surface between the ceramic and the braze material (braze failure between the metal substrate and the braze material is highly unlikely because of the metal to metal bonding). Examination of the broken pieces under a microscope revealed that the fracture occurred in the ceramic body itself and not at the ceramic-brazing alloy interface, indicating good bond integrity.

The titanium activation approach to the present brazing method was also tested on an assembly consisting of two pieces of the YSZ ceramic and the CRF chromium alloy. The brazing alloy was prepared by mixing 9.8 grams of AMS4782 powder with 0.2 grams of titanium hydride powder and tumbling the mixture in a blender for 30 minutes to ensure that titanium thoroughly mixed with the AMS4782 braze alloy. This produced a mixture of about 2 wt % titanium (but can use a titanium mixture of 0.5–5 wt %). The brazing alloy mixture was applied as a preform onto the CRF substrate by lightly spraying the surface with clear acrylic and then sprinkling a thin layer of the powder mixture onto the damp acrylic. Two pieces of CRF alloy were prepared this way and then sandwiched to a piece of YSZ ceramic. The assembly was loaded into a vacuum furnace with an 8-lb. weight to apply the clamping pressure. The AMS4782 brazing cycle described for the previous example was applied.

The same destructive testing method used in the previous example revealed similar results. The failure occurred in the ceramic and not in the ceramic-brazing alloy interface, thus indicating good braze bond integrity.

Figure 6:
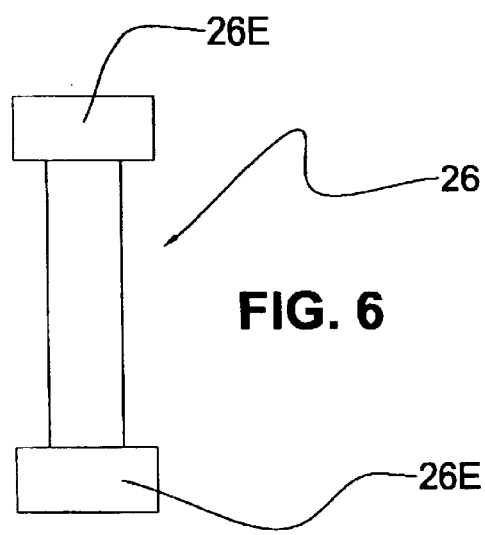
FIG. 6 schematically illustrates the ceramic vane of FIG. 5.
Figure 5:
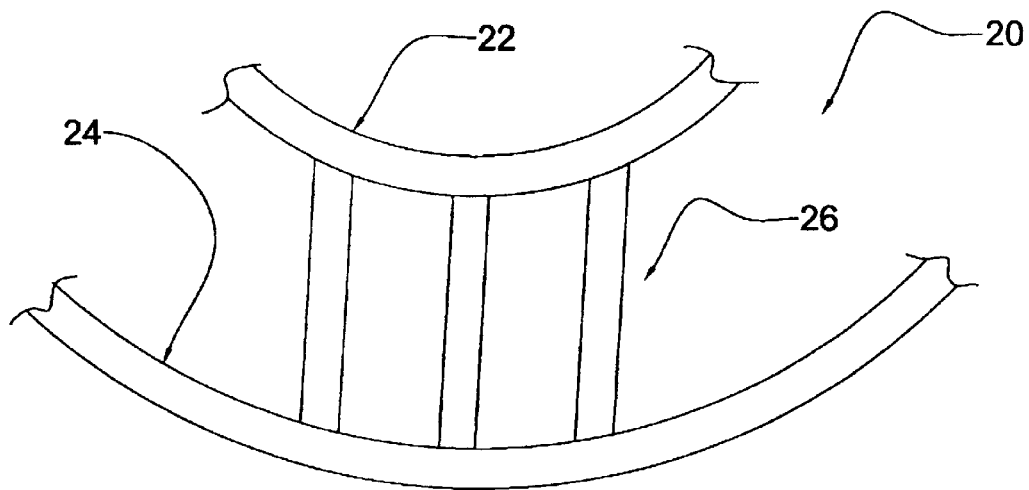
FIG. 5 schematically illustrates an example of another ceramic-metal application, namely an Inlet Guide Vane (IGV) assembly of a gas turbine engine.

FIGS. 5 and 6, schematically represent another specific application of the present brazing method. The component represents an inlet guide vane (IGV) assembly of a gas turbine engine. The IGV controls flow of the hot gases from the combustion chamber onto the turbine blades. In the example shown, the IGV includes a pair of concentric metal shrouds or platforms 22, 24 that are spaced apart from each other and joined together using a plurality of vanes 26 made of silicon nitride. The platforms 22, 24 are typically made of precipitation hardened nickel-base superalloys or single crystal growth alloys. The vanes 26 have an airfoil shape designed to direct the flow of the combustion gases in the center portion with thicker roots 26E at each end. The roots 26E fit into slots pierced or machined into the platforms 22, 24. A manufacturing procedure for the illustrated IGV can include coating the vane roots 26E by sputtering, holding the platforms in the required relationship, applying the selected brazing alloy at the vane/platform intersections, vacuum brazing as described previously, but with the temperatures adjusted for the selected braze alloy. Variations on the design of the IGV can include the inner or outer platforms, or both, made of silicon nitride integral with the air foil. The present brazing method can then be used to join the ceramic to a flat metal band or other structure.

It should be noted that an alloy containing a high nickel or cobalt content, in the range of 70–95% nickel by weight or 45–55% cobalt by weight, such as the alloys identified previously, and titanium in the range of 0.5–5% by weight is deemed novel, particularly for brazing ceramic or graphite to metal, with resulting joints that can withstand high temperatures. The present brazing method is applicable to all applications requiring joining metal to ceramic components.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

I claim:

1. A method of joining first and second components, the first component being composed of metal and the second component being composed of one of ceramic and graphite, the method comprising the steps of
    placing a brazing alloy between surfaces of the first and second components to be joined; and
    brazing the first and second components with the brazing alloy to join the first and second components together, in at least one of a vacuum atmosphere and an inert atmosphere, with the brazing temperature no greater than about 2200° F.,
    wherein the brazing alloy contains titanium in the range of 0.5–5 wt % and one of nickel in the range of 70–95 wt % and cobalt in the range of 45–55 wt %, but without aluminum, other than any negligible trace amount.

2. A method according to claim 1, wherein the brazing alloy is in a form of a tape, foil, or preform.

3. A method according to claim 1, further including the step of coating the surface of the second component to be joined with a metal layer.

4. A method according to claim 3, wherein the metal layer is composed of one of titanium and nickel.

5. A method according to claim 1, wherein the brazing alloy contains 70–95 wt % nickel, and the remainder containing at least one of boron, silicon, phosphorus, chromium, iron, and tungsten.

6. A method according to claim 1, wherein the brazing alloy contains 45–55 wt % cobalt, and the remainder containing at least one of boron, silicon, phosphorus, chromium, iron, and tungsten.

7. A method of joining first and second components, the first component being composed of metal and the second component being composed of one of ceramic and graphite, the method comprising the steps of:
    placing a brazing alloy between surfaces of the first and second components to be joined; and
    brazing the first and second components with the brazing alloy to join the first and second components together,
    wherein the brazing alloy contains titanium in the range of 0.5–5 wt % and one of nickel in the range of 70–95 wt % and cobalt in the range of 45–55 wt %, and
    wherein the brazing alloy is composed of the titanium and one of the compositions of AMS4776, AMS4777, AMS4778, AMS4779, AMS4782, AMS4783, and BNi-6.

8. A method according to claim 1, wherein the second component comprises at least one of alumina, silicon carbide, silicon nitride, single crystal sapphire, and zirconia.

9. A product formed according the method of claim 1.

10. A method according to claim 7, further including the step of coating the surface of the second component to be joined with a metal layer.

11. A method according to claim 10, wherein the metal layer is composed of one of titanium and nickel.

12. A product comprising:
    a metal component; and
    one of ceramic and graphite components brazed to the metal component with a brazing alloy,
    wherein the brazing alloy contains titanium in the range of 0.5–5 wt % and one of nickel in the range of 70–95 wt % and cobalt in the range of 45–55 wt %, joining the ceramic or graphite component to the metal component, and
    wherein the brazing alloy is composed of the titanium and one of the compositions of AMS4776, AMS4777, AMS4778, AMS4779, AMS4782, AMS4793, and BNi-6.

13. A product according to claim 12, wherein the brazing alloy contains 70–95 wt % nickel, and the remainder containing at least one of boron, silicon, phosphorus, chromium, iron, and tungsten.

14. A product according to claim 12, wherein the brazing alloy contains 45–55 wt % cobalt, and the remainder containing at least one of boron, silicon, phosphorus, chromium, iron, and tungsten.

15. A product according to claim 9, wherein the ceramic component is brazed to the metal component and comprises at least one of alumina, silicon carbide, silicon nitride, single crystal sapphire, and zirconia.

16. A product according to claim 9, wherein the product comprises an engine component.

17. A product according to claim 16, wherein the engine component is an inlet guide vane.

18. A product comprising a metal component; and one of ceramic and graphite components brazed to the metal component with a brazing alloy, wherein the brazing alloy contains titanium in the range of 0.5–5 wt % and one of nickel in the range of 70–95 wt % and cobalt in the range of 45–55 wt %, joining the ceramic or graphite component to the metal component, and wherein the product comprises a fuel cell.

19. A product according to claim 18, wherein the ceramic component is composed of yttria stabilized zirconia and the metal component is composed of metal having at least 94.5 wt % chromium.

20. A brazing alloy comprising:

one of nickel ranging 70–95 wt % and cobalt ranging 45–55 wt %; and titanium ranging 0.5–5 wt %, wherein the brazing alloy is composed of the titanium and one of the compositions of AMS4776, AMS4777, AMS4778, AMS4779, AMS4782, AMS4783, and BNi-6.

21. A brazing alloy according to claim 20, wherein the brazing alloy is for brazing a metal component to one of ceramic and graphite components.

22. A brazing alloy according to claim 20, containing nickel ranging 70–95 wt %, and the remainder containing at least one of boron, silicon, phosphorus, chromium, iron, and tungsten.

23. A brazing alloy according to claim 20, containing cobalt ranging 45–55 wt %, and the remainder containing boron, silicon, chromium, nickel, and tungsten.

24. A method according to claim 4, wherein the metal layer is composed of essentially pure titanium.

25. A product according to claim 9, wherein the product comprises a fuel cell.

26. A product according to claim 12, wherein the product comprises an engine component.

27. A product according to claim 12, wherein the product comprises a fuel cell.

* * * * *